US010718861B2

(12) United States Patent
Rick

(10) Patent No.: US 10,718,861 B2
(45) Date of Patent: Jul. 21, 2020

(54) FREQUENCY PROFILES FOR NON-CONTACT RANGE MEASUREMENT WITH MULTI-SCALE ANALYSIS

(71) Applicant: Hach Company, Loveland, CO (US)

(72) Inventor: David L. Rick, Longmont, CO (US)

(73) Assignee: HACH COMPANY, Loveland, CO (US)

( * ) Notice: Subject to any disclaimer, the term of this patent is extended or adjusted under 35 U.S.C. 154(b) by 237 days.

(21) Appl. No.: 15/711,591

(22) Filed: Sep. 21, 2017

(65) Prior Publication Data

US 2019/0086531 A1    Mar. 21, 2019

(51) Int. Cl.
*G01S 13/58* (2006.01)
*G01S 13/10* (2006.01)
(Continued)

(52) U.S. Cl.
CPC .......... *G01S 13/582* (2013.01); *G01F 23/284* (2013.01); *G01S 7/354* (2013.01); *G01S 7/4911* (2013.01); *G01S 7/4913* (2013.01); *G01S 7/536* (2013.01); *G01S 13/10* (2013.01); *G01S 13/34* (2013.01); *G01S 13/583* (2013.01); *G01S 13/88* (2013.01); *G01S 15/32* (2013.01); *G01S 15/586* (2013.01); *G01S 15/88* (2013.01); *G01S 17/32* (2013.01); *G01S 17/58* (2013.01); *G01S 17/88* (2013.01); *H04B 1/69* (2013.01);
(Continued)

(58) Field of Classification Search
CPC ...... G01S 13/582; G01S 23/284; G01S 7/354; G01S 7/4911
USPC .......................................... 342/112, 373, 343
See application file for complete search history.

(56) References Cited

U.S. PATENT DOCUMENTS 9,551,606 B2    1/2017 Fehrenbach et al.
9,625,295 B2    4/2017 Rick
(Continued)

FOREIGN PATENT DOCUMENTS

EP    1918736 A2    5/2006
EP    1918736 A2    5/2008

OTHER PUBLICATIONS

Vaidyanathan, P.P. et al., "Efficient Reconstruction of Band-Limited Sequences from Nonuniformly Decimated Versions by Use of Polyphase Filter Banks", IEEE Transactions on Acoustics, Speech, and Signal Processing, Nov. 1990, 10 pages, vol. 38, No. 11, IEEE Digital Library.
(Continued)

*Primary Examiner* — Bo Fan
(74) *Attorney, Agent, or Firm* — Ference & Associates LLC

(57) ABSTRACT

A method for constructing a frequency profile of an emitted signal suitable for use in a non-contact ranging system with multi-scale spectral analysis includes determining N stepped frequency chirps, wherein each frequency chirp of the N stepped frequency chirps has a linear FM modulation of predetermined bandwidth and slope, and wherein a starting frequency for each of the plurality of stepped frequency chirps is chosen so that a non-linear step profile is created which extends over a predetermined total bandwidth, sorting the plurality of N stepped frequency chirps into P subsequences, where P is equal to the product of decimation factors to be used in the multi-scale spectral analysis, and ordering the P sub-sequences end to end in time.

11 Claims, 14 Drawing Sheets

(51) Int. Cl.
*H04B 1/69* (2011.01)
*G01S 17/32* (2020.01)
*G01S 13/34* (2006.01)
*G01S 13/88* (2006.01)
*G01F 23/284* (2006.01)
*G01S 7/4913* (2020.01)
*G01S 7/536* (2006.01)
*G01S 7/4911* (2020.01)
*G01S 7/35* (2006.01)
*G01S 15/32* (2006.01)
*G01S 17/58* (2006.01)
*G01S 15/88* (2006.01)
*G01S 15/58* (2006.01)
*G01S 17/88* (2006.01)
*G01F 23/296* (2006.01)

(52) U.S. Cl.
CPC .... *G01F 23/2962* (2013.01); *G01S 2007/356* (2013.01); *H04B 2001/6912* (2013.01)

(56) References Cited

U.S. PATENT DOCUMENTS

2013/0041600 A1 2/2013 Rick
2017/0016984 A1* 1/2017 Lin ..................... G01S 13/584

OTHER PUBLICATIONS

Gladkova, Irina, "Analysis of Stepped-Frequency Pulse Train Design", IEEE Transactions on Aerospace and Electronic Systems, Oct. 2009, 11 Pages, vol. 45, Issue 4, IEEE Digital Library.
"Grating lobes suppression in stepped-frequency pulse train", IEEE Transactions on Aerospace and Electronic Systems, IEEE Service Center, Piscataway, NJ, val. 44, No. 4, Oct. 1, 2008, pp. 1265-1275.
European Patent Office, European Search Report, dated Jan. 25, 2019, pp. 14.

* cited by examiner

FREQUENCY PROFILES FOR NON-CONTACT RANGE MEASUREMENT WITH MULTI-SCALE ANALYSIS

BACKGROUND

The following information is provided to assist the reader in understanding technologies disclosed below and the environment in which such technologies may typically be used. The terms used herein are not intended to be limited to any particular narrow interpretation unless clearly stated otherwise in this document.

Non-contact sensors can be used to measure an object's distance and/or velocity. Non-contact sensors often emit energy signals such as one or more acoustic or electromagnetic signals toward an object. By analyzing the reflected signals, distance and velocity of the object may be determined. Examples of non-contact sensors include, for example, sonar, radar, laser, and UV devices.

Measuring fluid velocity and distance in partially filled open channels (for example, sewers, irrigation ditches, etc.) using radar is especially challenging. When measuring velocity of a flowing fluid, the signal must typically be emitted slantwise to the fluid surface, resulting in significant signal loss. The loss occurs because most of the incident energy glances off the fluid surface and continues propagating away from the sensor. Measuring distance in open channels may be very challenging when high accuracy is required (for example, millimeter accuracy at a maximum range of only a few meters). When monitoring open-channel flow, the measurement of distance is undertaken to determine the fluid level. With knowledge of the sensor position and channel geometry, fluid levels may be calculated from distance measurements. When measuring distance/level, the signal is typically emitted in a downward direction.

Recently, Frequency Modulated Continuous Wave (FMCW) radar systems have been designed which are capable of measuring fluid depth and velocity in open channels. Devices exist in which certain radar components are shared between a down-looking antenna for level measurement and a slantwise-oriented antenna for velocity measurement (see FIG. 1). A continuous wave (CW) signal for velocity is emitted in a slant wise fashion to the fluid being measured, and a frequency modulated (FMCW) signal for distance is emitted perpendicular to the fluid. A perpendicular signal is emitted to obtain a strong return signal so that the required distance accuracy is obtained. As a consequence, fluid level and velocity are measured at two distinct points.

When measuring fluid flow, volumetric flow rate can be calculated as the product of the fluid's cross-sectional area and average fluid velocity. For open channel flow (for example, sewers, conduits, etc.), the cross-sectional area may be calculated from the fluid level, given knowledge of the channel geometry. However, if velocity and level are not measured at the same point, computations of volumetric flow rate may be in error. For example, if conduit slope, or conduit cross-sectional area change between the two measurement points, or if a change in fluid level occurs as a result of some upstream or downstream condition, calculation of flow rate may be inaccurate. It is, therefore, desirable in non-contact flow sensors to measure distance and velocity at the same point.

To measure distance and velocity at the same point, both the velocity and distance signals must typically be emitted in a slant-wise fashion to the fluid, which results in most of the radar energy glancing off the fluid surface. Very little of the energy bounces back toward the detector. The resultant high loss adds significantly to the difficulty of making a valid distance measurement. Measurement becomes particularly difficult as the range gets shorter (in part as a result of leakage peaks and associated side lobes in the spectrum of the received signal).

Often, the signals used in FMCW ranging systems are emitted as "chirps." Chirps are modulated signals that increase or decrease frequency with time. Individual linear chirps can be characterized by a starting frequency, a slope, and a time duration.

More general frequency modulations may be constructed by assembling a series of chirps end to end. Using a ramping phase locked loop or PLL, a diverse set of linear frequency modulated or LFM pulse trains can be created, each comprising a set of chirps. When each LFM chirp has a different starting frequency, the modulation is called a "stepped LFM sequence" Or a "stepped sequence." The frequency steps may be chosen to be uniform or non-uniform in size.

When a modulated signal is emitted towards one or more targets by a radar or sonar transducer, reflections from the target(s) are synchronously demodulated to produce a signal called an "intermediate frequency signal", or "IF signal".

The demodulated IF signal may be digitized and analyzed via spectral analysis to determine information about the target, e.g., distance, velocity, etc. Spectral analysis refers to the analysis of the demodulated IF signal with respect to frequency, rather than time. This is often accomplished by calculating the signal's discrete Fourier transform (DFT), for example, via a fast Fourier transform algorithm or FFT. The output of a DFT-based spectral analysis is called a periodogram, or "power spectral density." Depending upon its use, it may also be called a Doppler spectrum, velocity spectrum, or range spectrum.

Proper design of the modulation sequence is important to ensure correct sensor operation. If stepped LFM sequences are not designed correctly, the device may not function as intended. Proper design of stepped LFM sequences is necessary to preserve phase coherency, control the magnitude of unwanted and high amplitude side lobe signals, prevent aliasing, control noise, etc.

Stepped LFM sequences are also designed to accommodate spectral analysis (for example, FFT). Parameters of the FFT algorithm include frame size (or 'number of bins') and sampling rate. Frame size is the total number of samples used in the calculation and sampling rate corresponds to a frequency of data acquisition. Thus, a snapshot of the IF signal is gathered corresponding to a time duration equal to (frame size)/(sampling rate). This time duration is also called frame length. Ideally, the IF signal from a complete stepped LFM sequence will fit exactly into one FFT frame.

A radar instrument designed to measure a fluid level in open channels and sewers may require minimum range resolution of approximately a millimeter (mm) and maximum range of several meters (m). An FMCW ranging device designed for this range requires a very large FFT window that may be impractical, waste valuable computing time, and have large associated power consumption.

There exists a multi-scale analysis methodology that optimizes computing time and minimizes power consumption during FFT analysis for Doppler velocity measurements. The method includes several concurrent spectral analysis processes, each operating at a different sample rate and having a different window duration and frequency resolution. A decimation process is used to reduce the data rate between one analysis "scale" and the next. Because the same FFT length is used at each spectral analysis scale, a single FFT engine or subroutine may often be shared between all analysis scales.

Applying multi-scale analysis to an FMCW ranging device may significantly improve its precision and resolution while minimizing computation effort. However, conventional FMCW schemes cannot be implemented with multi-scale analysis, as a result of interference from high amplitude side lobes, aliasing, etc. during spectral analysis.

BRIEF SUMMARY

In one aspect, a method for constructing a frequency profile of an emitted signal suitable for use in a non-contact ranging system with multi-scale spectral analysis includes determining N stepped frequency chirps, wherein each frequency chirp of the N stepped frequency chirps has a linear FM modulation of a predetermined bandwidth and slope, and wherein a starting frequency for each of the plurality of stepped frequency chirps is chosen so that a non-linear step profile is created which extends over a predetermined total bandwidth, sorting the plurality of N stepped frequency chirps into P sub-sequences, where P is equal to the product of decimation factors to be used in the multi-scale spectral analysis, and ordering the P sub-sequences end to end in time. The plurality of N stepped frequency chirps may, for example, be represented only once in the P sub-sequences and each of the P sub sequences extends to at least 90% of the predetermined total bandwidth. In a number of embodiments, the duration of emitting the P sub-sequences or multiple of the P sub-sequences is equal to the duration of a longest duration frame in the multi-scale spectral analysis or a multiple thereof.

In a number of embodiments, the method further includes, prior to sorting the plurality of N stepped frequency chirps into P sub sequences, enumerating groups of the N stepped frequency chirps as $G_0$ through $G_{(N-1)}$ to define even-indexed groups of frequency chirps and odd-indexed groups of frequency chirps, and reordering one of the even-indexed groups of frequency chirps and the odd-indexed groups of frequency chirps in time to begin at an end of the other one of the even-indexed groups of frequency chirps and the odd-indexed groups of frequency chirps and in reverse order.

Sorting the N stepped frequency chirps into P sub-sequences may, for example, include re-enumerating the reordered frequency chirps as $C_0$ through $C_{(N-1)}$, and sorting the reordered frequency chirps into P sub-sequences, wherein $\{\text{sub-sequence}\}_n = \{C_n, C_{(n+P)}, C_{(n+2P)}, C_{(n+3P)}, \ldots\}$ where n=0 to (P−1).

In a number of embodiments, the slope of each of the plurality of frequency chirps is selected to resolve a minimum range target frequency from a zero range frequency. The fastest sampling rate may, for example, be equal to or a multiple of the step rate for the plurality of N stepped frequency chirps. A total bandwidth of the non-linear step profile may, for example, be chosen to attain a desired distance resolution in frequency modulated continuous wave radar. In a number of embodiments, the predetermined total bandwidth of the non-linear step profile is greater than or equal to 1.5 GHz.

The non-linear step profile may, for example, be chosen to control the magnitude of unwanted spectral side lobes. In a number of embodiments, the non-linear step profile includes a parametric frequency profile or a tapering distribution.

In another aspect, a non-contact distance measurement system includes a transmitter, at least one receiver, a processor system operatively coupled to the transmitter and the at least one receiver, and a memory device that stores instructions executable by the processor system to emit an electromagnetic or acoustic signal via the transmitter suitable for use in multi-scale spectral analysis of a time domain signal representative of a target range. A profile for the emitted signal is constructed by determining N stepped frequency chirps, wherein each frequency chirp of the N stepped frequency chirps has a linear frequency modulation of predetermined bandwidth and slope. A unique starting frequency for each of the plurality of linear frequency chirps is chosen so that a non-linear step profile is created which extends over a predetermined total bandwidth. The plurality of N linear frequency chirps are sorted into P sub-sequences, where P is equal to the product of decimation factors to be used in the multi-scale spectral analysis, and the P sub-sequences are ordered end to end in time. The memory device may, for example, further store instruction executable by the processor system to create two or more spectral estimates for the time domain signal, where the two or more spectral estimates have a different decimation factor.

In a further aspect, a system to measure fluid velocity and range within a flow channel including a transmitter, at least one receiver, a processor system operatively coupled to the transmitter and the at least one receiver, and a memory device that stores instructions executable by the processor system to emit an electromagnetic or acoustic signal via the transmitter suitable for use in multi-scale spectral analysis of a time domain signal representative of reflection of the emitted signal received by the at least one receiver. As described above, a profile for the emitted signal is constructed by determining N stepped frequency chirps, wherein each frequency chirp of the N stepped frequency chirps has a linear frequency modulation of predetermined bandwidth and slope, and wherein a unique starting frequency for each of the plurality of stepped frequency chirps is chosen so that a non-linear step profile is created which extends over a predetermined total bandwidth. The plurality of N stepped frequency chirps are sorted into P sub-sequences, where P is equal to the product of decimation factors to be used in the multi-scale spectral analysis, and the P sub-sequences are ordered end to end in time. A Doppler velocity peak may, for example, be used to compensate for the effects of a flowing fluid on a target range. In a number of embodiments, the memory device further stores instructions executable by the processor system to create two or more spectral estimates for the time domain signal, where the two or more spectral estimates have a different decimation factor.

The present methods, devices, and systems, along with the attributes and attendant advantages thereof, will best be appreciated and understood in view of the following detailed description taken in conjunction with the accompanying drawings.

DETAILED DESCRIPTION

Figure 1:
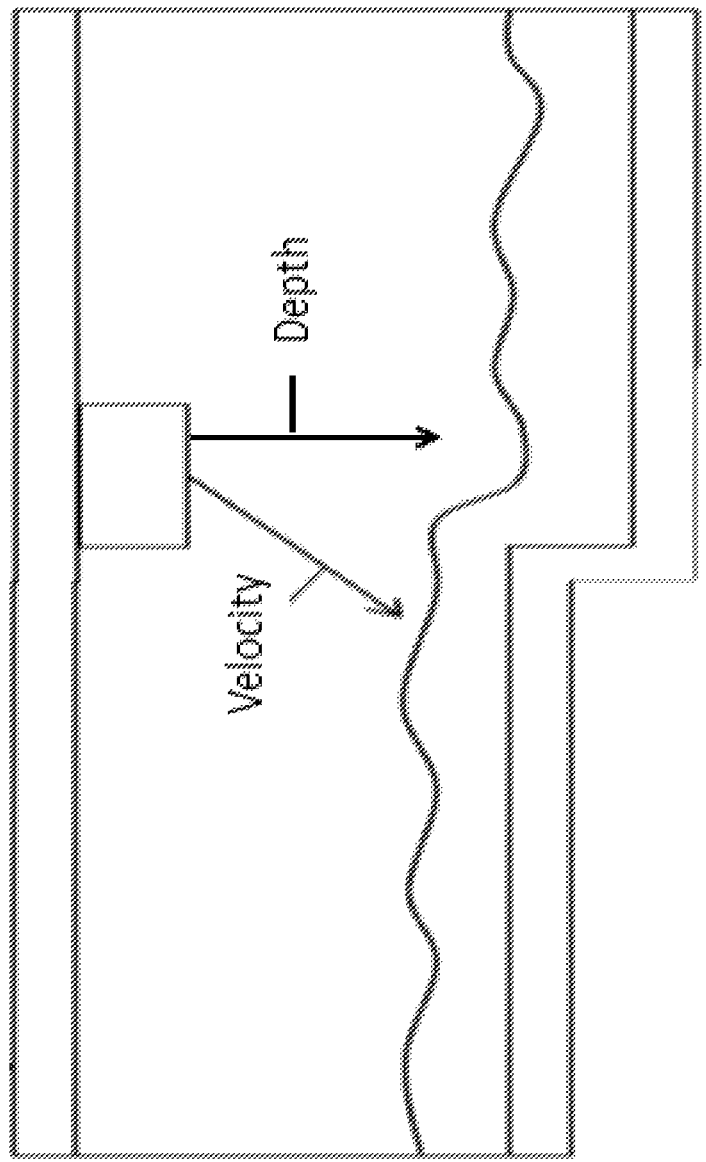
FIG. 1 illustrates a non contact sensor measuring fluid velocity and depth in a sewer.

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etcetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "frequency profile" includes a plurality of such frequency profiles and equivalents thereof known to those skilled in the art, and so forth, and reference to "frequency sub-sequence" is a reference to one or more such frequency sub-sequences and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

The terms "electronic circuitry", "circuitry" or "circuit," as used herein includes, but is not limited to, hardware, firmware, software or combinations of each to perform a function(s) or an action(s). For example, based on a desired feature or need. a circuit may include a software controlled microprocessor, discrete logic such as an application specific integrated circuit (ASIC), or other programmed logic device. A circuit may also be fully embodied as software. As used herein, "circuit" is considered synonymous with "logic." The term "logic", as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software.

The term "control system" or "controller," as used herein includes, but is not limited to, any circuit or device that coordinates and controls the operation of, for example, one or more input or output devices. For example, a controller can include a device having one or more processors, microprocessors, or central processing units (CPUs) capable of being programmed to perform input or output functions.

The term "processor," as used herein includes, but is not limited to, one or more of virtually any number of processor systems or stand-alone processors which perform defined processes or calculations or manipulate data, such as microprocessors, microcontrollers, central processing units (CPUs), and digital signal processors (DSPs), in any combination. A processor may be associated with various other circuits that support operation of the processor, such as a memory system (for example, random access memory (RAM), read-only memory (ROM), programmable read-only memory (PROM), erasable programmable read only memory (EPROM)), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

The term "software," as used herein includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, or the desires of a designer/programmer or the like.

Figure 2:
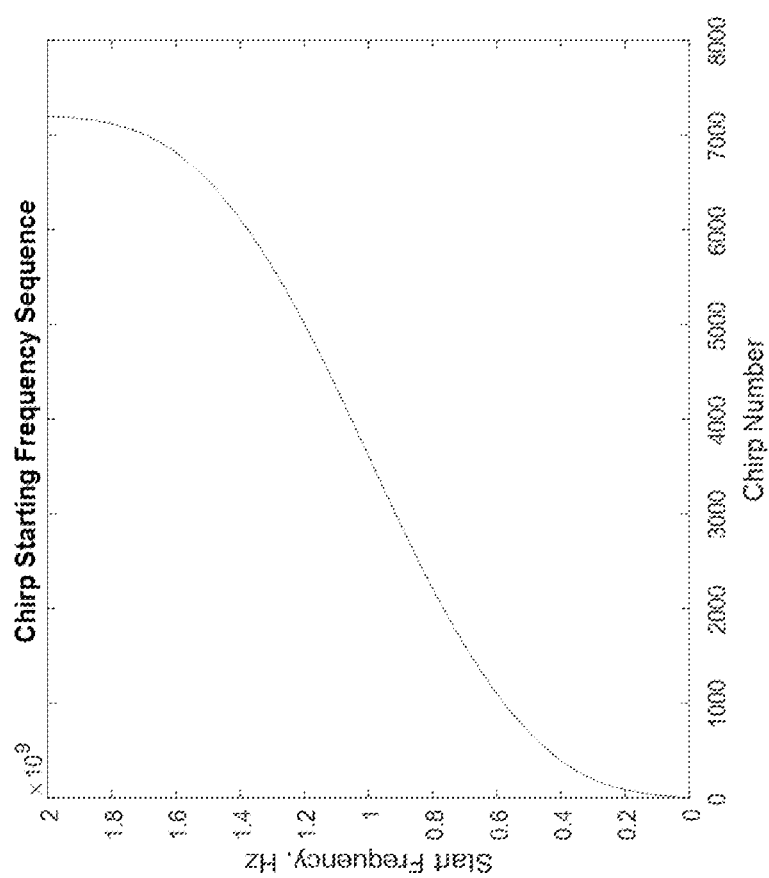
FIG. 2 illustrates a stepped LFM modulation sequence following a 'Gladkova type' profile.

A stepped LFM radar/sonar modulation may be characterized by the bandwidth and FM slope of individual chirps, and further by a set of chirp starting frequencies comprising a complete modulation sequence (see FIG. 2). Individual chirps typically exhibit linear frequency modulation, but the starting frequency sequence may exhibit nonlinear step sizes.

To construct stepped linear frequency modulations for an FMCW ranging radar, several parameters are chosen including number of chirps, chirp starting frequencies, chirp slope, chirp step rate, total bandwidth, etc. These parameters may be chosen such that desired performance specifications are obtained, and so that the parameters conform to the capabilities of the device.

For an FMCW ranging instrument, the return frequency is theoretically offset to the emitted frequency according to $$f_r = f_{IF} + \frac{2S}{c} r \qquad (1)$$

wherein $f_r$ is the frequency observed at the mixer output, S is the chirp slope, r is the distance, c is the speed of light, and $f_{IF}$ is an offset or intermediate frequency determined by use of a local oscillator. In a number of embodiments, chirp slope is chosen to be large enough to resolve the desired minimum range peak from the zero-range 'leakage peak' (see FIG. 3). For $f_{IF}$=0, a range to frequency conversion constant is defined as $K_r = f_r/r = 2S/c$. In a number of embodiments, chirp slope is chosen to yield a desired range to frequency conversion constant. For example, $K_r$ may be approximately 800 Hz/meter.

Figure 3:
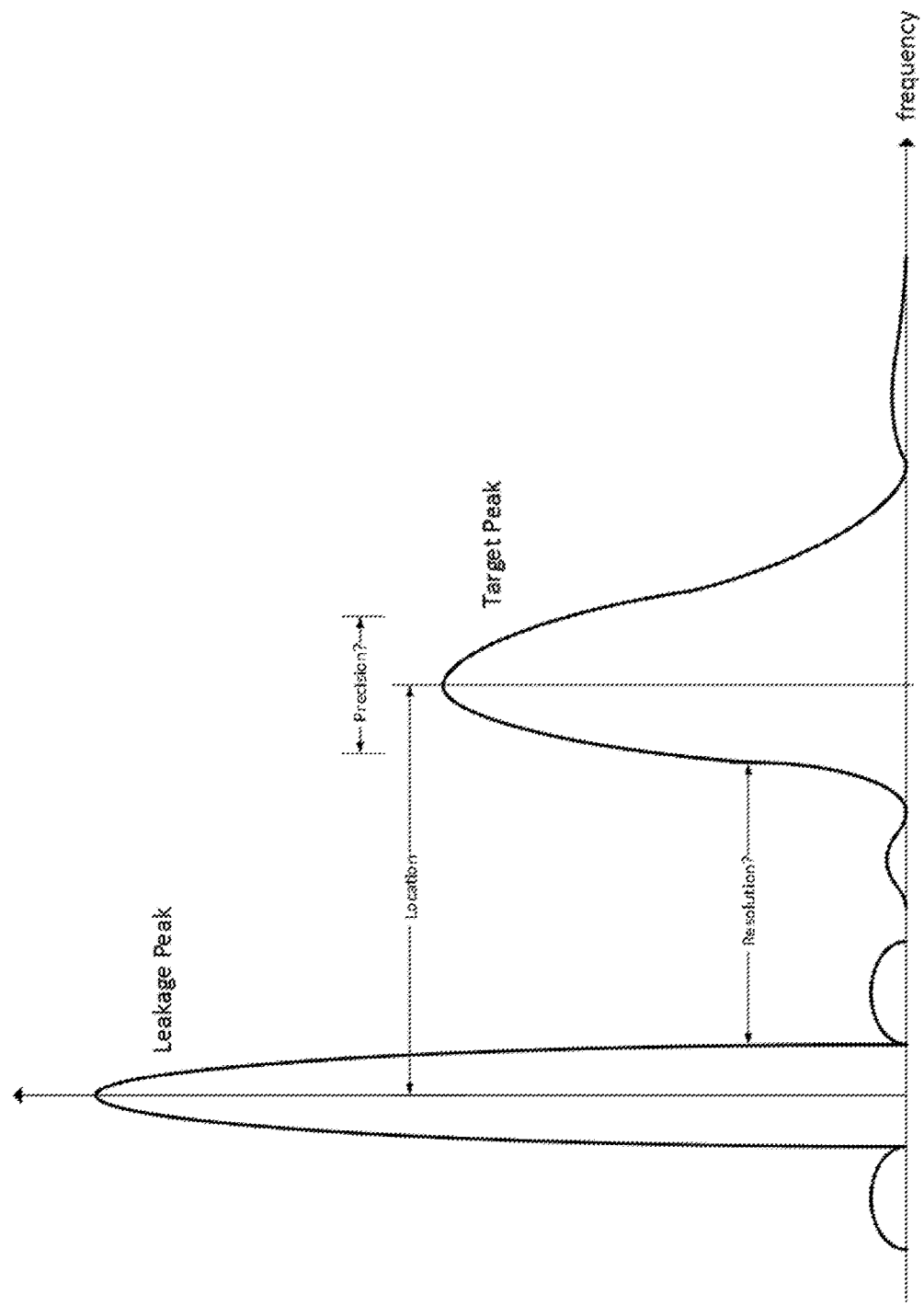
FIG. 3 illustrates a representative range peak shape for a particular antenna and the zero range leakage peak for an FMCW radar device.

Because of 'range spread,' the resulting return frequency will manifest as a spectrum of frequencies with varying signal strengths, i.e., a 'range peak.' The range peak shape depends on both the antenna pattern and its mounting geometry relative to the fluid surface. A representative example of a calculated range peak shape for an FMCW radar instrument is shown in FIG. 3. Also, shown in FIG. 3 is a zero-range peak resulting from direct leakage of the emitted signal to the receiver, called a leakage peak.

Figure 4:
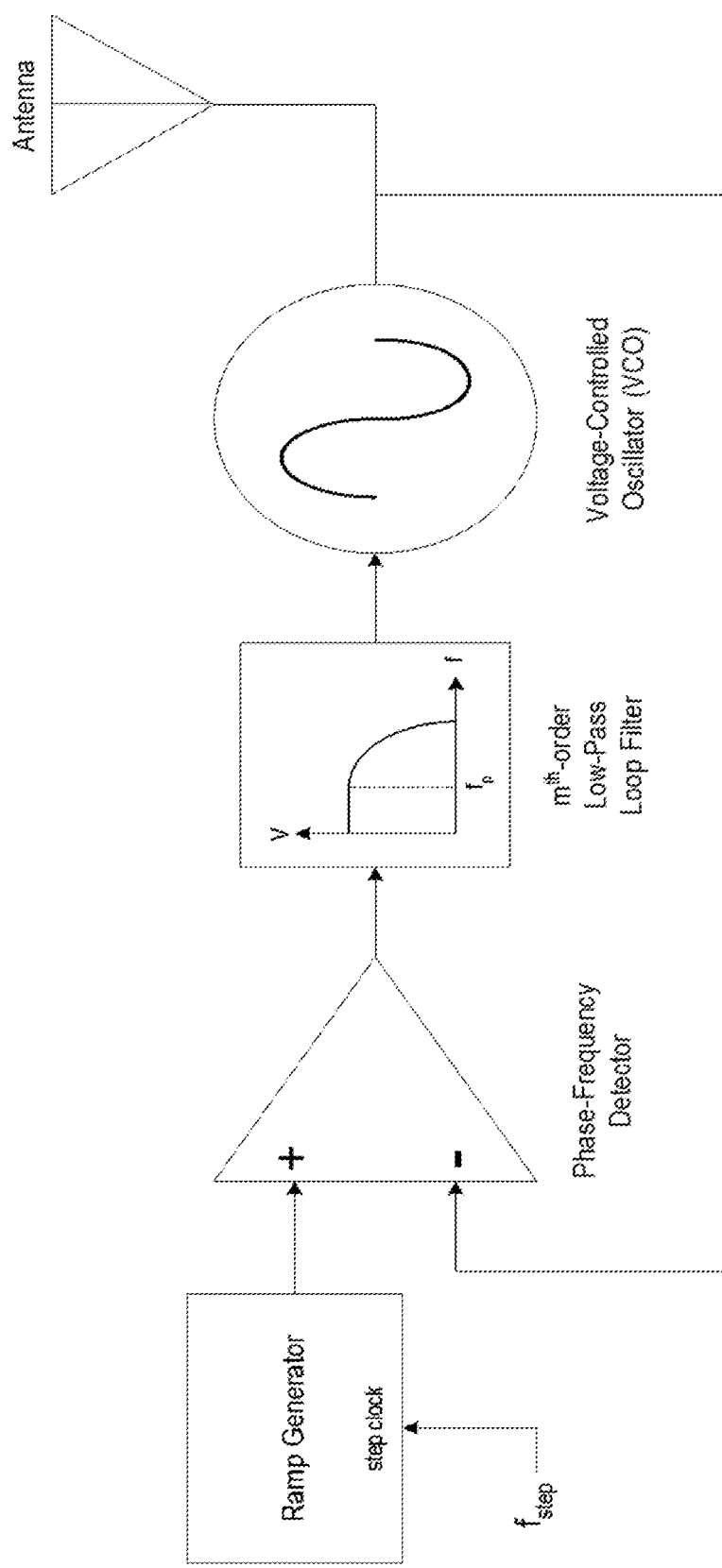
FIG. 4 illustrates a PLL frequency synthesizer with loop filter.

Chirps may, for example, be synthesized using commonly available FMCW radar chipsets, including a voltage-controlled oscillator (VCO) and a phase locked loop (PLL) to stabilize it. Phase-locked loops typically incorporate a feedback "loop filter." FIG. 4 illustrates an embodiment of a complete FMCW frequency synthesizer. Typically, the ramp generator and phase-frequency detector are part of a PLL chip. A voltage-controlled oscillator may, for example, be part of the radar transceiver chip, and a loop filter may be built from discrete components. Design parameters of the frequency synthesizer include loop bandwidth $f_p$ and loop filter of order m. Second-order loops (m=2) are most commonly used. The ramp step clock has frequency $f_{step}$. These ramp steps may be distinguished from the chirp-to-chirp frequency steps described earlier. Some commonly-employed ramping PLL's approximate continuous FM ramps by creating a fine sequence of smaller frequency steps. These "stair steps" occur at a rate, $f_{step}$, which is much faster than the chirp repetition rate.

Individual chirps may comprise a plurality of small escalating frequency modulations (e.g., stair steps). A complete modulation sequence also employs larger steps between successive LFM chirps. Small frequency steps may contribute to range uncertainty if not properly smoothed. The larger inter-ramp frequency steps do not affect range linearity, but are used to increase the total modulation bandwidth. In practice, the size of large steps may be limited by the bandwidth of the PLL's analog feedback control loop. If too large a frequency step is requested, the loop may become "unlocked," and phase coherency will be lost. In a number of embodiments, the FM chirps and the control loop that governs them are designed to maintain phase coherency.

In a number of embodiments, the loop filter (see FIG. 4) is able to smooth the frequency stair steps and improve range uncertainty, with the result expressed as $$\Delta r = \left(\frac{c}{2}\right) \frac{f_p^m}{f_{step}^{m+1}} \qquad (2)$$

To minimize $\Delta r$ and improve range uncertainty, the step clock frequency may, for example, be set as high as practical while the loop bandwidth is set as low as practical). Here, m denotes the PLL loop order, and $f_p$ denotes the loop bandwidth. In a number of representative embodiments, $f_p = 10 * f_w$ (wherein $f_w$ is the chirp repetition rate). In a representative embodiment, the loop filter is a second-order filter with a −3 dB bandwidth of 240 kHz. For such embodiments, a 48 MHz step clock results in a residual range linearity error less than 0.08 mm.

Figure 5:
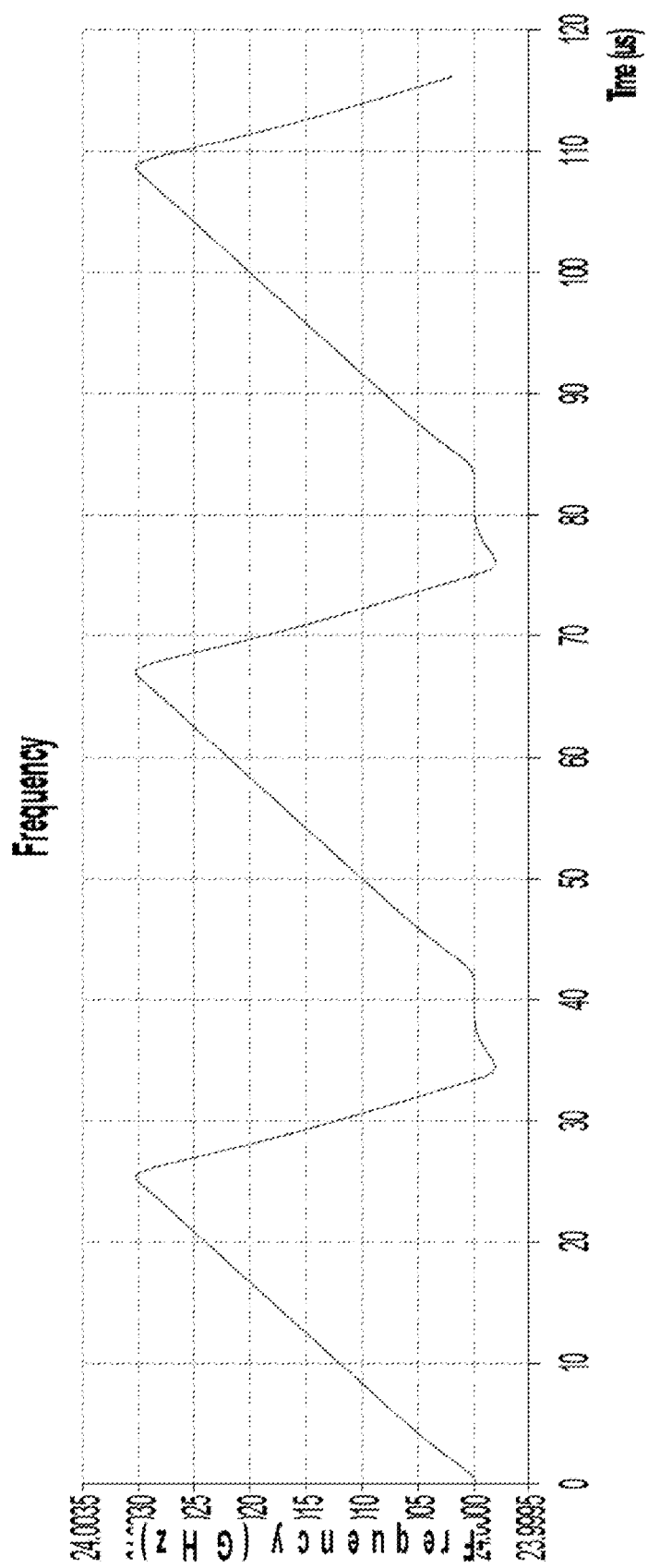
FIG. 5 illustrates simulation of three identical FM chirps for a particular VCO, PLL, and loop filter.

A representative embodiment of a chirp modulation is shown in FIG. 5. Although the chirp modulation shape of FIG. 5 is more complex than a simple saw tooth or triangular modulation, the range to frequency conversion still depends on the chirp slope, S, (of the up-ramp, in this case). Thus, $$K_r = f_r/r = 2S/c \qquad (3)$$

where $K_r$ is the range to frequency constant as described above. The waveform shown has a ramp slope, S, of 120 kHz/μsec, leading to $K_r$=800 Hz/m.

Design of stepped modulation profiles is important to ensure correct system operation. If step profiles are not designed correctly, the system may not function as intended. In some embodiments, the starting frequency of the successive chirps are spaced to ensure that the systems' PLL's analog feedback control loop stays "locked" and does not lose phase coherency.

In several embodiments, stepped LFM sequence profiles are created using a ramping PLL comprising a set of "chirps" according to FIG. 5, each with a different starting frequency.

Minimum range detection in small pipes requires modulations with wide bandwidth. Wide bandwidth is desirable to optimize range resolution and to enable measurement at short distances. The problem at short distances is that the range spectrum will also contain a zero-range leakage peak, from which the desired short-range target must be distinguished. For a 'matched filter receiver' and two targets of equal amplitude. the (physical) range resolution is defined by $$\Delta r_{phys} = \frac{c}{2B} \qquad (4)$$

where $\Delta r_{phys}$ is the physical range resolution, B is the total modulation bandwidth, and c is the speed of light. In a number of embodiments, total modulation bandwidth is chosen to obtain a desired range resolution. A bandwidth of 2 GHz, for example, yields a best-case range resolution (minimum boresight range) of 7.5 cm. In practice, some further degradation of this minimum range may be traded for lower range side lobes. This trade-off is accomplished through various means, depending on the modulation scheme. In the case of stepped-LFM sequences, it may be accomplished through design of the step profile.

Maximum range is often determined by frequency domain harmonics. A repeating sequence of identical chirps or pulses manifests in the frequency domain as a series of harmonic lines spaced at intervals of the fundamental modulation frequency, $f_w$. This frequency is also called the chirp repetition rate or pulse modulation repetition rate. In addition, the zero-range leakage peak will be replicated at this same frequency interval. The range at which a target peak overlaps with the next zero-range replica is called the "maximum unambiguous range". This overlap occurs at $$r_{max} = N \frac{c}{qB} \qquad (5)$$

where $r_{max}$=maximum unambiguous range, N=number of chirps in the stepped LFM sequence, and q is a constant that depends on the ratio of individual chirp duration to the time interval between adjacent chirps.

In a number of embodiments, a stepped LFM sequence may be created from a plurality of chirps wherein each chirp has a different starting frequency. As the number of distinct chirps in the stepped LFM sequence increases, the maximum unambiguous range is also increased. In some embodiments, the number of chirps (N) in an LFM sequence is chosen to yield a desired maximum range. In a number of representative embodiments, N=7200.

Varying each successive pulse or chirp is called 'pulse diversity', and may be used to achieve a desired maximum unambiguous range. Pulse diversity may, for example, be achieved by a) varying the radar pulse amplitudes, b) varying the spacing between pulses, c) varying the starting phase of successive pulses, d) varying the pulse starting frequencies, or e) changing their FM modulation slopes.

In typical FMCW chipsets, pulse diversity may be created via frequency and phase diversity schemes, but there is usually no convenient provision for pulse amplitude modulation. In a number of embodiments hereof, stepped LFM sequences are created using FMCW chipsets and a frequency diversity scheme.

Figure 6:
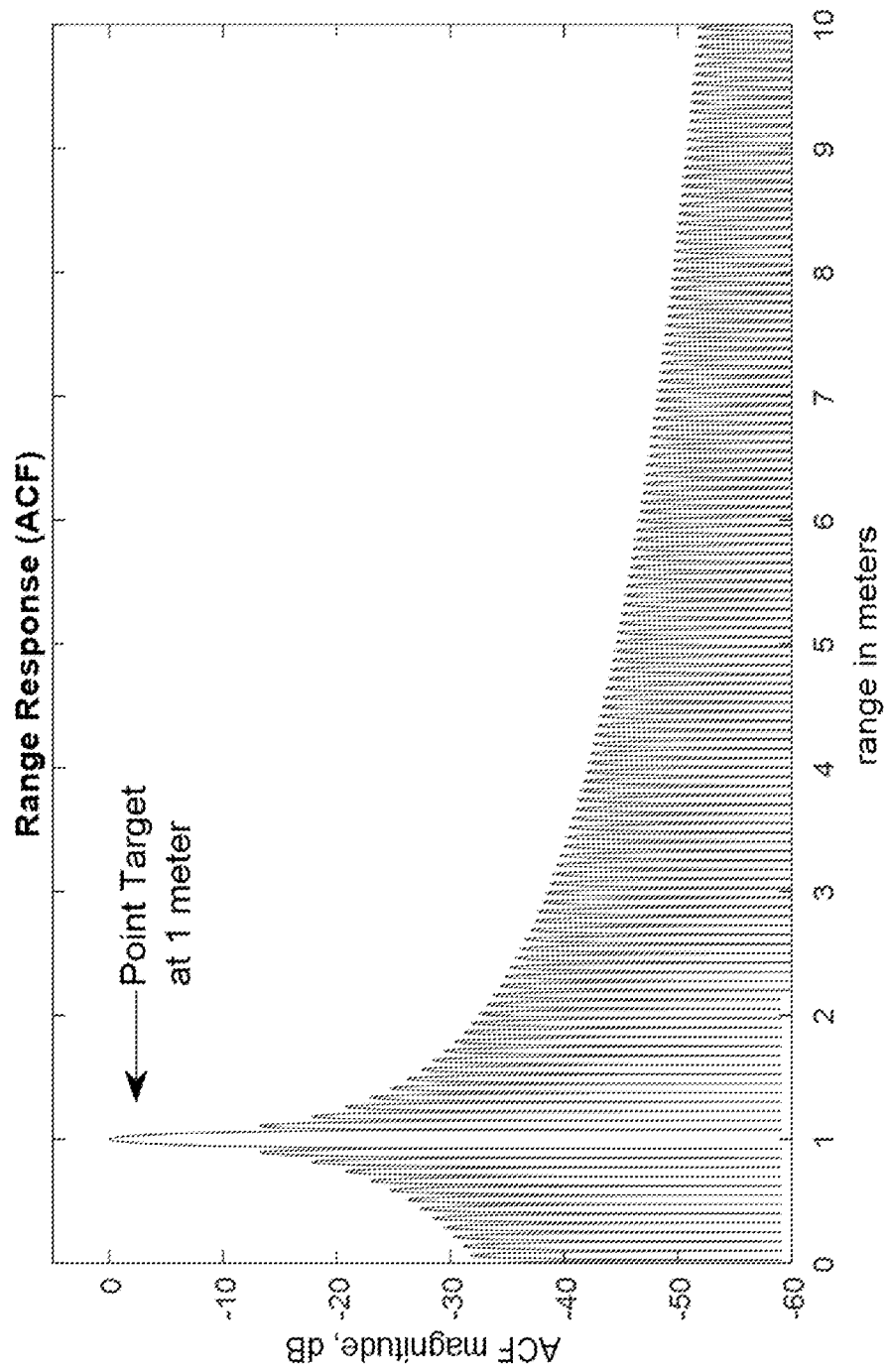
FIG. 6 illustrates spectral analysis (converted to distance) of a target at 1 meter for a stepped LFM radar with equal frequency steps between chirps.

Stepped LFM sequences may, for example, be created by incrementing the starting frequency of successive chirps. However, the use of equal frequency steps between successive chirps leads to unwanted and high amplitude side lobe signals in the range response. FIG. 6 shows spectral analysis (converted to distance) of a target at 1 m for a stepped LFM radar with equal frequency steps between chirps. The target response includes a plurality of unwanted side lobes, the nearest of which are only 13 dB below the main lobe. A similar set of side lobes will be seen on the zero-range leakage peak, and may hide a weak radar return from the fluid surface, especially at short range.

Minimum detection range is an important specification in small pipes, and in nearly-full pipes of any size. Minimum detection range may be improved by minimizing the magnitude of spectral side lobes. In a number of embodiments hereof, spacing of chirp starting frequencies according to a non-linear step profile is used to minimize the magnitude of unwanted spectral side lobes surrounding each range peak. Minimum range is an important specification for radar ranging instruments.

A 'Gladkova type' non-linear stepped LFM sequence may, for example, be used to control the height of un-wanted spectral side lobes. An example of such a profile is plotted in FIG. 2. Height of spectral side lobes may also, for example, be controlled with profiles derived from the Taylor, Hamming, or Blackman-Harris 'tapering' distributions. Other non-linear tapering distributions may also be used to control height of spectral side lobes.

Figure 7:
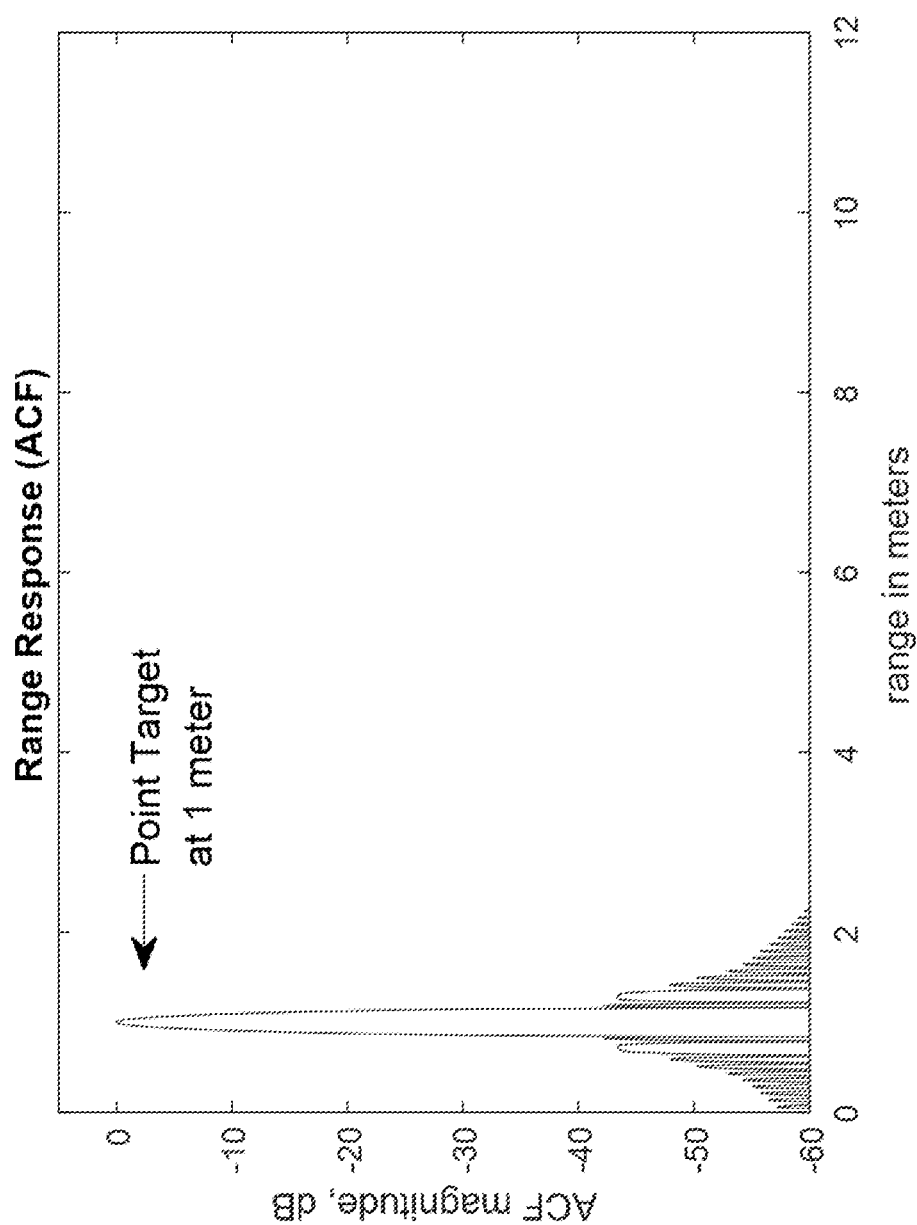
FIG. 7 illustrates spectral analysis (converted to distance) of a target at 1 meter for a "Gladkova type" stepped LFM radar.

FIG. 7 shows a frequency domain (converted to distance) target response of a 'Gladkova type', stepped LFM radar with 7200 distinct chirps. Compared to FIG. 6, the nearest side lobes are 42 dB down, and more distant side lobes decay rapidly. An FMCW radar using a 'Gladkova type' step profile yields better range resolution than one using a linear (equal step) profile.

In a number of representative embodiments, a non-linear stepped LFM sequence may be transmitted a plurality of times, nose to tail, via a ramping PLL. To assist in preventing a PLL from losing phase lock, the starting and ending chirp frequencies may, for example, be spaced in a manner to be within the capability of the PLL. Repeating a 'Gladkova type' step profile as illustrated in FIG. 2 results in a rapid step change from approximately 2 GHz offset to approximately 0 Hz offset, and may cause some PLL's to lose phase lock. In a number of embodiments hereof, a non-linear, stepped profile of chirps is created in which such large step changes in starting frequency are avoided. For example, in a number of embodiments, an LFM step profile is formed by creating a 'near' mirror image of a non-linear stepped profile such as a "Gladkova type' profile by rearranging the frequency chirps. The resultant LFM profile is described as a 'near' mirror image because every chirp in the LFM profile has a distinct starting frequency.

Figure 8:
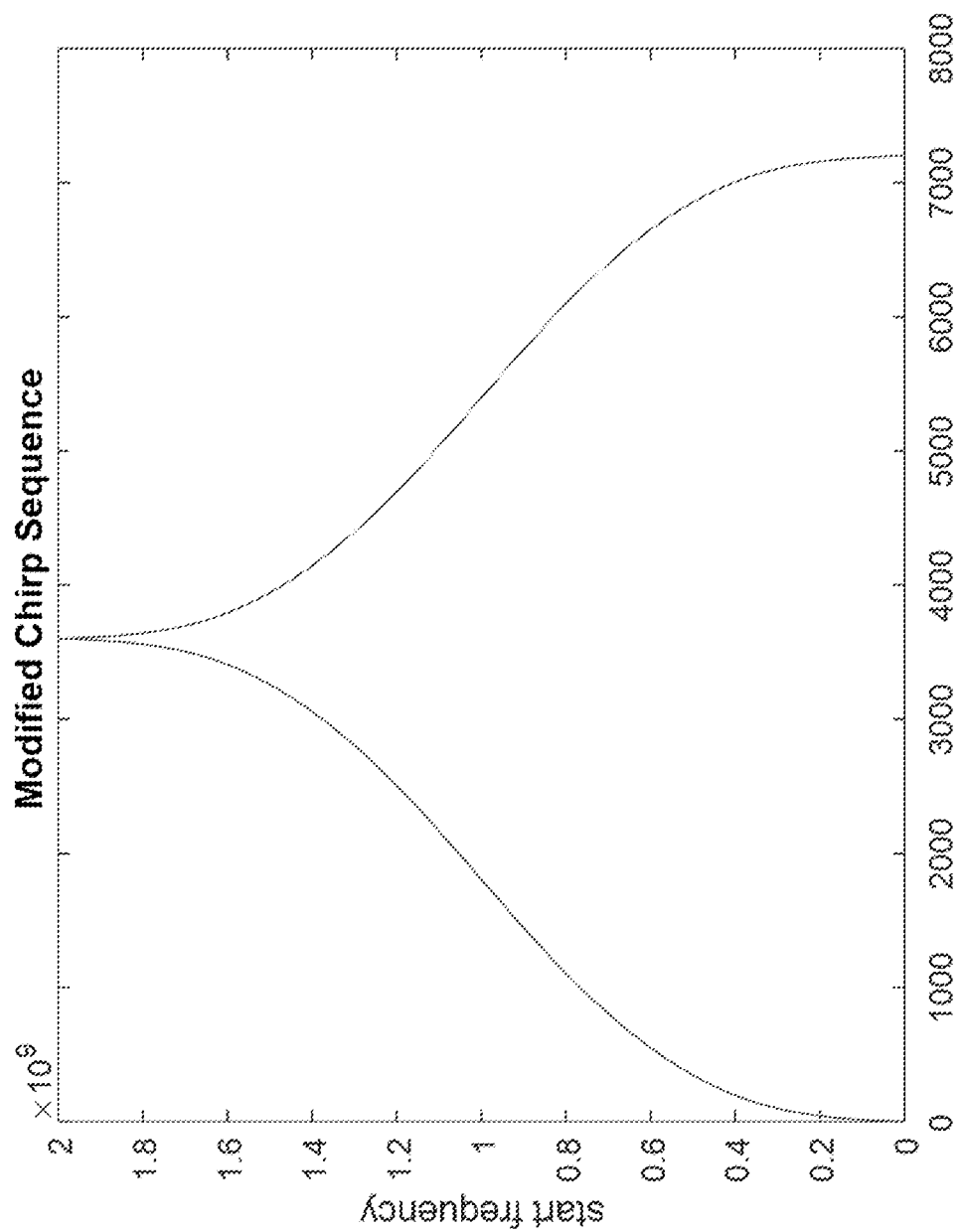
FIG. 8 illustrates a modified chirp sequence. A "minaret profile" derived from the Gladkova type profile of 7200 chirps.

A representative embodiment of a method for constructing such a mirrored profile includes: 1) enumerating the N stepped frequency chirps of a profile such as illustrated in FIG. 2 as $G_0$ through $G_{(N-1)}$ to define even-indexed groups of frequency chirps and odd-indexed groups of frequency chirps; and reordering one of the indexed groups in time to begin at an end of the other indexed group and in reverse order. In one embodiment, a 'Gladkova type' non-linear stepped LFM profile is created using this method to form the profile illustrated in FIG. 8. Although the profile in FIG. 8 appears symmetrical (or mirrored), the right half actually includes a completely different set of starting frequencies than the left half. The profile depicted in FIG. 8 is sometimes referred to herein as a "minaret profile" as a result of its evocative shape. The minaret profile is a representative example of a plurality of possible starting frequency profiles.

In a number of representative embodiments hereof, a stepped LFM profile is designed or processed such that its reflected IF signal and/or its associated digital signal accommodates spectral analysis (for example, periodograms computed using a FFT). To process data in real time, the system must be able to complete spectral analysis on a given data frame before acquisition of the next data frame finishes. The chosen data frame length influences the practicality of this requirement. While longer frame lengths permit finer frequency resolution (and potentially better depth resolution), in conventional systems the maximum frame length will eventually be limited by processing capability. The present invention mitigates this conflict though use of multi-scale spectral analysis.

An analog IF signal may, for example, be demodulated, converted to a digital signal, and processed according to an FFT algorithm. As the FFT algorithm proceeds, time domain data is converted to frequency data and put into bins. Each bin corresponds to a band of frequencies called 'bin width' or 'frequency resolution'. Frequency resolution is defined by sampling rate/(number of bins).

The number of bins (or frame size) may, for example, correspond to the computer's available memory locations or random access memory (RAM) (for example, 256, 512, 1024, etc.). Alternatively, frame size may correspond to a desired range resolution. In a number of representative embodiments hereof, the frame size is 480.

Sampling rate and frame size may, for example, be chosen to obtain a desired minimum range resolution. In a number of embodiments, a range to frequency conversion ratio (defined as $K_r=f_r/r$) may, for example, be approximately 800 Hz/meter and a minimum range specification may be 0.002 m, corresponding to a required frequency resolution of 1.6 Hz (0.002 m*800 Hz/m). For a 480 point frame size, the corresponding sampling rate=1.6 Hz*480=768 Hz. The 480 point frame encompasses 768 Hz or 0.96 m.

The sampling rate and frame size may alternatively be chosen to obtain a desired maximum range. For 3 m maximum range, sampling rate corresponds to 3 m*800 Hz/m=2.4 kHz. corresponding to a frequency resolution of 5 Hz.

In a number of embodiments, the entire range peak may be required to be included in the FFT frame. For the range peak shape shown in FIG. 3, for example, peak width stretches from approximately 0.79 to 1.46 of the actual range value. Frame size may, for example, be increased to encompass the whole range peak. The peak may, for example, be centered so that the whole peak remains in the frame.

In a number of embodiments, frame size is chosen to obtain both minimum and maximum range values. Using the examples above, a 0.002 m minimum range and a 3 m maximum range yields a frame size=2.4 kHz/1.6 Hz=1500 bins. A frame size of this magnitude may be physically impractical and also waste valuable computing time and associated power consumption. In a number of embodiments, spectral analysis systems and methods hereof enable measurement of a wide distance range, while optimizing computing time and reducing power consumption using multi-scale spectral analysis.

The number of chirps in the stepped LFM profile may, for example, be chosen with consideration to the FFT's time duration (referenced as frame length, which equals the number of bins/sampling rate). It is common practice that the sampling rate ($f_s$) is chosen to be 'equal to' or 'a multiple of' the chirp repetition rate (that is, the step rate). The time duration for emitting the frequency profile may, for example be chosen to be equal to the frame length. In a number of embodiments, the chirp repetition rate equals the sampling rate and the time span of the complete modulation sequence equals the frame length. For this situation, the number of chirps in the profile will equal the frame size (that is, number of bins).

Figure 9:
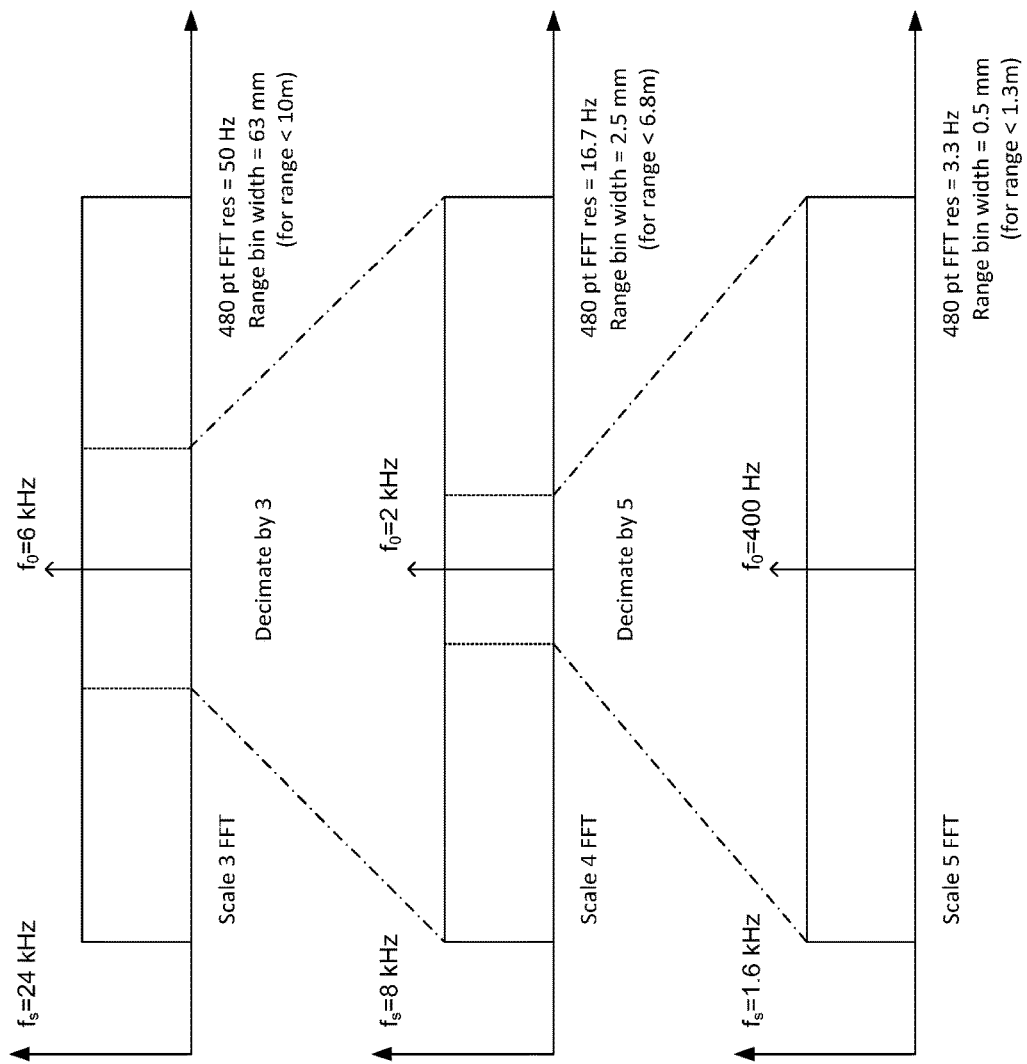
FIG. 9 depicts a multiscale analysis plan suitable for use in FMCW range measurement.

FIG. 9 illustrates a representative embodiment of an FFT multi-scale analysis methodology hereof, which includes three simultaneous spectral analysis processes, each operating at a different sample rate and having a different frame length and frequency resolution. A decimation process is used to reduce the data rate between one analysis 'scale' and the next. Because the same frame size is used at each spectral analysis scale, a single FFT engine or subroutine may, for example, often be shared between all three analysis scales.

In the illustrated embodiment, the uppermost or top FFT (labeled "Scale 3 FFT") processes data at a sample rate of 24 kHz. Dividing the sample rate by the FFT length of 480 points yields a frequency resolution of 50 Hz. The middle FFT (labeled "Scale 4 FFT") processes decimated data at ⅓ of the previous rate, yielding a frequency resolution of 16.7 Hz and correspondingly finer range resolution. The lowermost or bottom FFT (labeled "Scale 5 FFT") processes decimated data at ⅕ of the previous rate, yielding a frequency resolution of 3.3 Hz.

In a number of embodiments, a range to frequency conversion ratio (defined as $K_r=f_r/r$) is approximately 800 Hz/meter. In the embodiment of FIG. 9, "Scale 5 FFT" may have a range resolution that is 15 times finer than Scale 3, but spanning only 1/15 of Scale 3's total range. The computational effort required to achieve such an improvement of range resolution in a conventionally-architected instrument is considerable. Achieving it in a single-scale instrument or method would require using a FFT 15 times as long. The memory required would increase proportionately, and the computation effort would increase by a factor of roughly $15*\log_2(15)$, or nearly 59 times. In contrast, a multi-scale instrument as taught herein can achieve this improvement with less than a factor-of-two increase in computational effort. Additional details concerning the general nature of multi-scale FFT analysis may, for example, be found in U.S. Pat. No. 9,625,295 B2.

A problem exists with applying a stepped frequency profile, such as that in FIG. 8, to an FMCW radar using multi-scale analysis. To reduce the magnitude of side lobes and aliasing, the IF signal (and corresponding LFM profile) should have a time duration corresponding to the frame length (that is, frame size/$f_s$, where $f_s$=sampling rate). However, the "Scales" depicted in FIG. 9 have different frame lengths. The Scale 5 frame length is 15 times longer than the Scale 3 frame length. If an LFM profile is designed to match the Scale 5 FFT frame length, then an FFT on Scale 4 or Scale 3 will process data from only a fraction of the profile, and the corresponding modulation bandwidths processed on these scales will be a fraction of what was intended. For nonlinear LFM profiles, the resulting degradation in bandwidth, and hence in range resolution, may be much worse than a simple ratio of the sample rates, because some portions of the profile may be flatter than others. Conversely, if a non-linear step profile matches the frame length of Scale 3, then the other scales will see an IF signal that corresponds to a repetition of chirp frequencies within a single frame, which will result in range ambiguity as a result of the appearance of additional false target peaks, called 'grating lobes'.

Accordingly, in a number of embodiments hereof, a new type of emitted frequency profile (wherein the reflected IF signal is robust under integer decimations of multi-scale spectral analysis) is devised. As described above, a profile may include N stepped frequency chirps, wherein each frequency chirp of the N stepped frequency chirps has a linear FM modulation of predetermined bandwidth and slope, and wherein a starting frequency for each of the plurality of stepped frequency chirps is chosen so that a non-linear step profile is created which extends over a predetermined total bandwidth. In a number of embodiments hereof, the N stepped frequency chirps are sorted into P sub-sequences, where P is equal to the product of decimation factors to be used in the multi-scale spectral analysis, and the P sub-sequences are ordered end to end in time.

Thus, in a number of embodiments, a method of constructing novel frequency profiles, suitable for use in multi-scale spectral analysis includes: 1) determining N stepped frequency chirps as described above, 2) sorting the plurality of N stepped frequency chirps into P sub-sequences, where P is equal to the product of decimation factors to be used in the multi-scale spectral analysis, and 3) ordering the P sub-sequences end to end in time. For the analysis scheme depicted in FIG. 9, for example, P=3*5=15.

In a number of embodiments, the plurality of N stepped frequency chirps are initially arranged in order from the lowest to highest starting frequency, as, for example, in the Gladkova profile depicted in FIG. 2. Each of the plurality of N stepped frequency chirps may, for example, be represented only once in the P sub-sequences and each of the P sub sequences may, for example, extend to approximately the predetermined total bandwidth.

In an embodiment of a sorting methodology, the N stepped frequency chirps frequencies are first re-enumerated (left to right) as $C_0$ through $C_{(N-1)}$, and sorted into P sub-sequences or "phases," designated as phase 0 through phase (P−1), where $\{sub\text{-}sequence\}_n = \{C_n, C_{(n+P)}, C_{(n+2P)}, C_{(n+3P)}, \ldots \}_n$, where n=0 to (P−1). A large frequency step may result from concatenating such sequences, however. Improved results may be obtained by performing an odd/even reordering before performing such a polyphase reordering.

The highest frequency sample rate may be chosen to be equal to the FMCW chirp repetition rate (i.e. the step rate). In a number of embodiments, the time duration for emitting the plurality of N stepped frequency chirps is chosen to be equal to the longest-duration frame length. When the chirp step rate is chosen to be equal to the fastest sampling rate and the time duration for emitting the plurality of N stepped frequency chirps is chosen to be equal to the longest-duration frame length, then the value of N will be the product of the frame size (i.e., number of bins) and the decimation ratios. For the representative multi-scale analysis methodology of FIG. 9, the number of chirps in the profile would be 480*5*3=7200.

Figure 10:
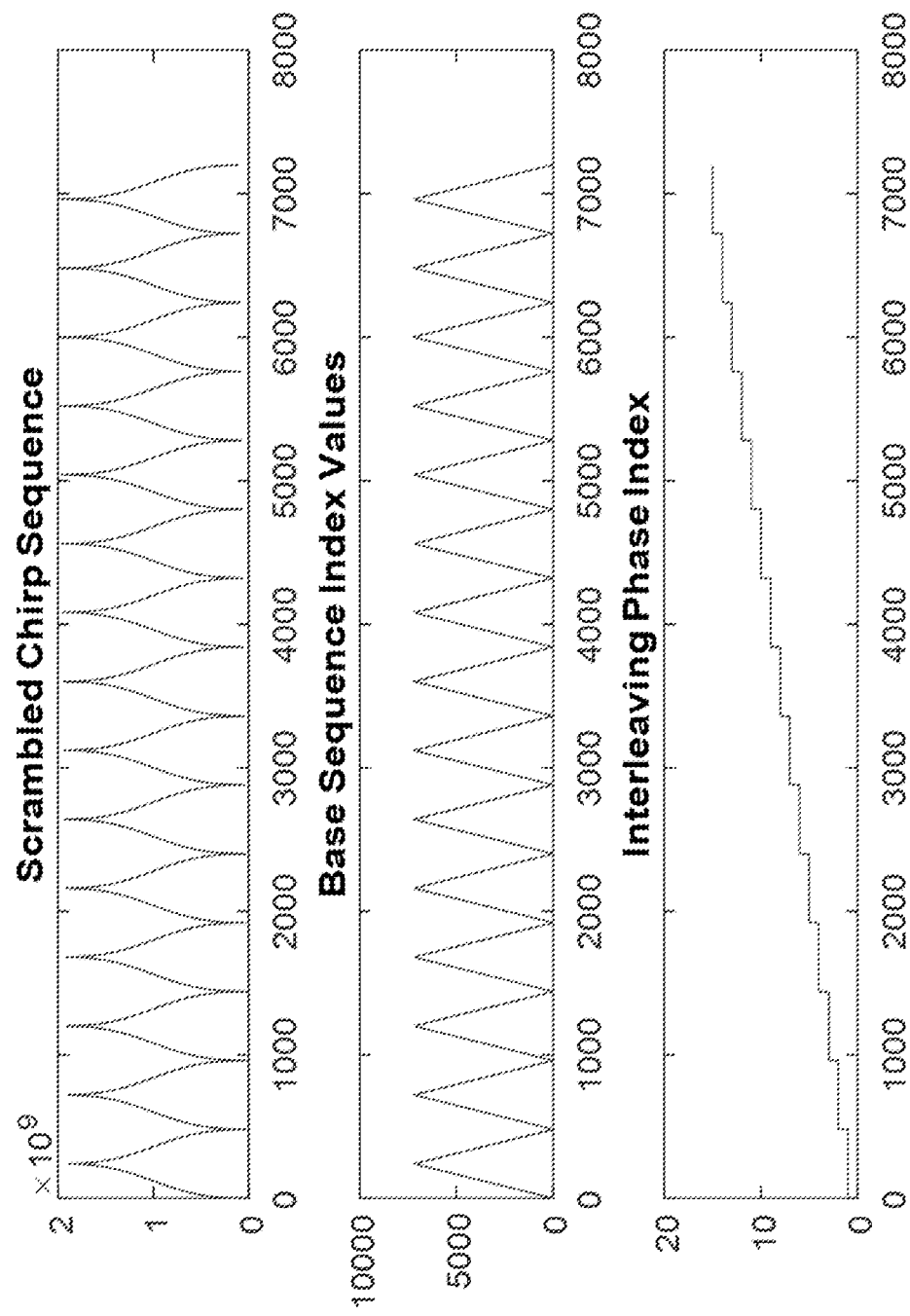
FIG. 10 illustrates a 'polyphase minaret' chirp frequency sequence, together with the index and phase sequence values used to obtain it from the minaret profile of FIG. 8.

In a representative embodiment, the chirp frequencies in the minaret profile such as FIG. 8 (which was derived from a 'Gladkova type' profile as in FIG. 2) are re-enumerated (left to right) as $C_0$ through $C_{(N-1)}$, and sorted into P sub-sequences or "phases," designated as phase 0 through phase (P−1), where $\{sub\text{-}sequence\}_n = \{C_n, C_{(n+P)}, C_{(n+2P)}, C_{(n+3P)}, \ldots \}_n$, where n=0 to (P−1). The subsequences are then placed end-to-end in time to form a chirp sequence of the original length. This reordered chirp sequence, illustrated in FIG. 10, is sometimes referred to herein as a 'polyphase minaret' profile. There are a number of ways to achieve such a profile. For example, the profile may be created directly from a 'Gladkova type' profile via an appropriate reordering scheme. The 'polyphase minaret' profile is suitable for multi-scale spectral analysis and minimizes the size of any step change in starting frequency. Like the minaret profile of FIG. 8, each 'mini-minaret' of the 'polyphase minaret' profile first increases in start frequency and then decreases in start frequency such that there is only a relative small change or jump in start frequency from the end of one 'mini-minaret' to the beginning of another 'mini-minaret'. Once again, this facilitates maintenance of phase-lock for a PLL. However, given a suitably robust PLL, one skilled in the art appreciates that end-to-end arranged mini Gladkova type or other types of non-linear step profiles may be utilized in the P sub-sequences of the methods and systems hereof.

FIG. 10 illustrates the 'polyphase minaret' sequence, together with the index and phase values used to derive it from the basic minaret profile in FIG. 8 and the multi-scale analysis plan of FIG. 9. This new sequence comprises 15 'mini-minarets.' Although each mini-minaret has a similar appearance, each mini-minaret contains a distinct set of chirp frequencies. Each chirp frequency from the starting minaret profile occurs once and only once in the reordered sequence. In the described representative embodiment and a number of other embodiments, each of the P sub-sequences includes one of the P lowest (starting) frequency chirps and one of the P highest (starting) frequency chirps.

Figure 11:
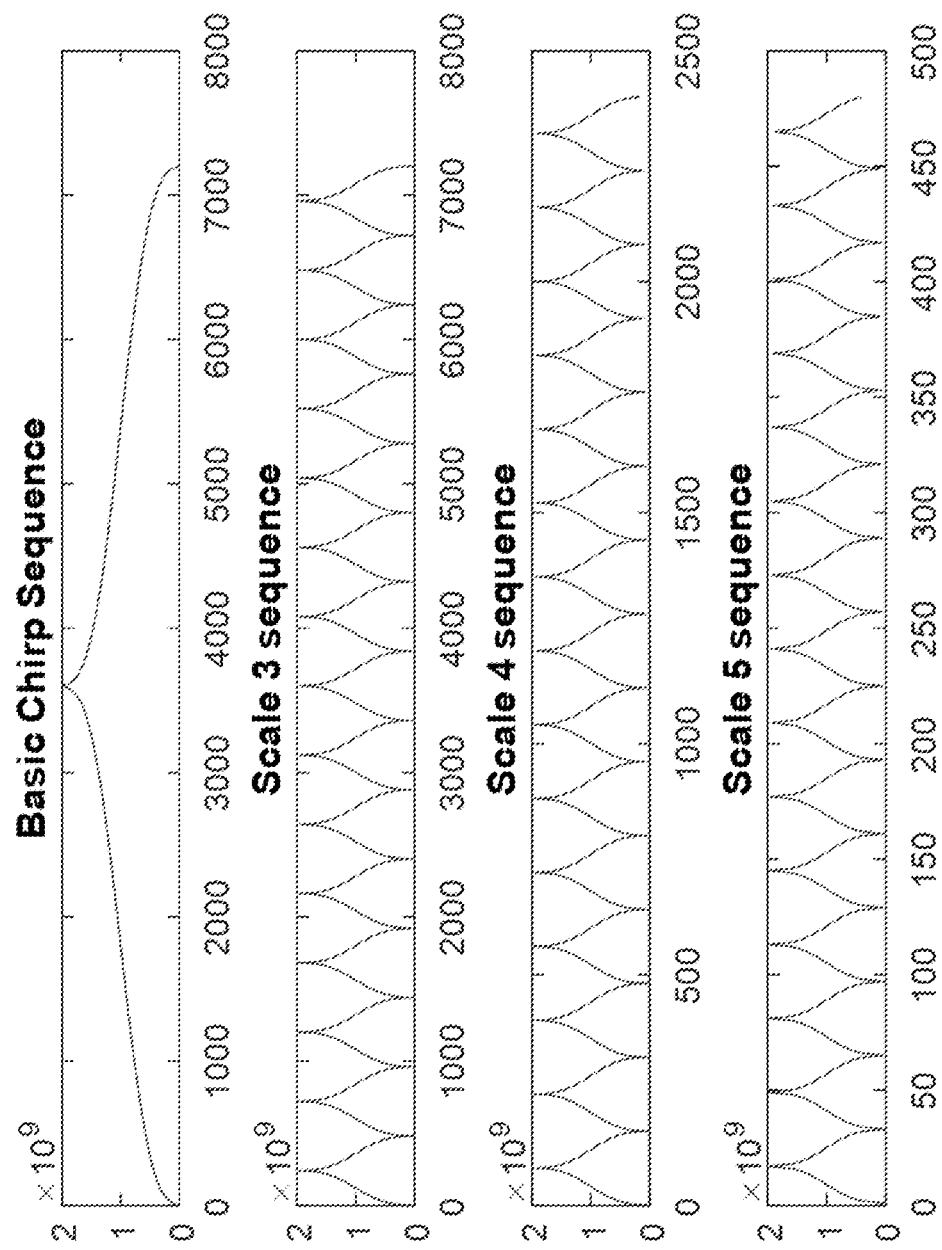
FIG. 11 illustrates a polyphase minaret profile, as if observed on three analysis scales.

FIG. 11 illustrates the initial minaret frequency profile (derived from the profile of FIG. 2) and the polyphase minaret profile as if observed on the three analysis scales of FIG. 9. This figure is drawn as if the emitted radar or sonar signal was digitized and subjected to multi-scale analysis. In reality, what is digitized and analyzed is typically a demodulated IF signal. This graphical representation, however, allows one to envision the chirp starting frequencies from which the FFT results on each scale derive.

The modulation sequence shown for Scale 3 is the complete polyphase minaret sequence, containing 7200 distinct starting frequencies corresponding to FIG. 8. In the time domain, there is enough data to fill 15 non-overlapping FFT frames of 480 points each. Data from one "mini-minaret" fits precisely in each FFT frame. Thus, each FFT frame receives data from a (nearly) 2 GHz bandwidth and from a step profile designed to mitigate side lobes.

The Scale 4 sequence is the result of a 3:1 decimation of the data set from Scale 3 and contains 2400 points. There is enough data to fill 5 non-overlapping FFT frames of 480 points each. Each frame contains data from 3 mini-minarets. As with Scale 3, each mini-minaret contains a distinct set of chirp frequencies, and each FFT frame receives data from a (nearly) 2 GHz bandwidth and from a step profile designed to mitigate side lobes.

At Scale 5, a further 5:1 decimation leaves 480 data points. There is exactly enough data to fill one FFT frame. The one FFT frame contains data from 15 mini-minarets. As with Scale 3, each mini-minaret contains a distinct set of chirp frequencies and the FFT frame receives data from a nearly 2 GHz bandwidth and from a step profile designed to mitigate side lobes. Many other types of profiles and sub-sequences may be envisioned by those skilled in the art.

The described methodology for constructing frequency profiles assures that spectral analysis on every analysis scale benefits from approximately the intended full modulation bandwidth. The described methodology ensures that spectral analysis on every analysis scale processes data from a set of chirps having a distribution of starting frequencies which is congruent with or approximating the starting non-linear step profile. The polyphase minaret profile of FIG. 10 is, for example, similar in bandwidth and statistical frequency distribution to the minaret profile of FIG. 8.

Figure 12:
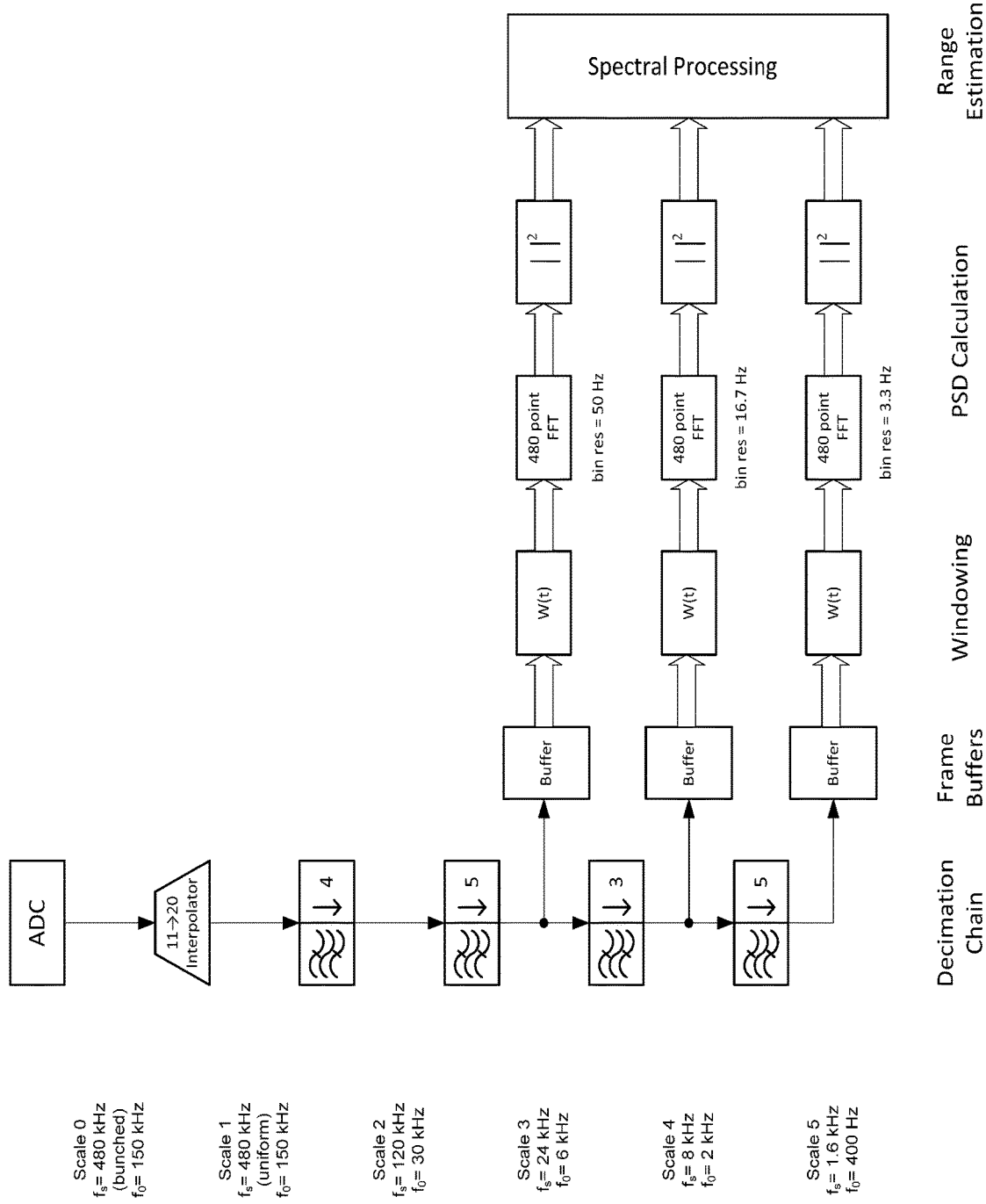
FIG. 12 illustrates a complete decimation scheme to implement multi-scale range estimation.

FIG. 12 illustrates a representative example of a complete multi-scale decimation scheme which can implement the analysis of FIG. 9. The analog-to-digital converter or ADC at the top of FIG. 12 digitizes the demodulated IF signal. In a number of embodiments a 'bunched' sampling scheme may, for example, be used to process data only from the chirp up-slopes. The bunched data may, for example, be converted to a continuous time signal using an interpolator block. In a number of embodiments, a polyphase interpolation structure is used to reconstruct a continuous time signal. Other methods of interpolating bunched-sample data are known in signal-processing art, and this invention is not limited to particular method.

The bandpass filtering and decimation processes may, for example, be combined together into processing blocks called "bandpass decimators", several of which may be seen in the decimation chain on the left side of FIG. 12. The decimation chain processes real-valued data, and each subsequent bandpass decimator reduces the sample rate by an integer factor. The nominal IF frequency ($f_0$) at Scale 2 may, for example, be chosen as one-quarter of the Scale 2 sample frequency. Once this desired IF positioning is achieved, it may be maintained through subsequent decimations provided that only odd integer decimation ratios are used.

In a number of embodiments, the leakage peak is positioned at $f_0$ in FIG. 9. In other embodiments, the local oscillator (LO) may, for example, be adjusted to position the leakage peak to the edge of the FFT frame, which will nearly double the instrument's range. A methodology for adjusting the position of $f_0$ to accommodate multi-scale analysis may, for example, include adjusting the LO offset to position the zero-range leakage peak at one edge of Scale 3 in FIG. 9. The edge depends on the FM ramp direction and the decimation scheme. A peak from the maximum measurable range then occurs at the other edge of Scale 3, and half the maximum range at $f_0$. The methodology further includes examining the range spectrum on Scale 3 to obtain an initial estimate of the target's range, and adjusting the LO offset to re-center the range peak near $f_0$. For sufficiently short ranges, this facilitates a better range measurement using Scale 4 or Scale 5. A potential limitation is fitting the peak's null-to-null range spread within the span of a particular analysis scale. For one embodiment having a range peak shape similar to that shown in FIG. 3, the second nulls appear at 0.79 and 1.46 times the target's range. Therefore, to see the main lobe and first side lobes on a given analysis scale, its range span must be at least $0.67f_r$, where $f_r$ is the target's range frequency.

The non linear step profile of FIG. 2 reflects an IF signal that yields excellent point target resolution (see FIG. 7). A reordering of the chirp starting frequencies has no effect on the range spectrum in the case of stationary targets. Thus, the minaret profile of FIG. 2 or the polyphase minaret profile of FIG. 10 has exactly the same ranging performance. For a moving target, such as a flowing water surface, the result may be different, but this problem can eliminated by performing Doppler shift compensation as known in the art when demodulating the received signal. If the fluid velocity is measured prior to the range measurement, then the required compensation may, for example, include simply adjusting a local oscillator to match the known Doppler shift.

In a number of embodiments, the local oscillator is adjusted to correct for a Doppler velocity shift. The relationship between fluid velocity and Doppler shift is:

$$f_d = \left(\frac{2\cos\psi}{c}\right) f_{cw} \cdot v \quad (6)$$

where v is the (streamwise) fluid velocity, $f_{cw}$ is the (fixed) carrier frequency, and $\psi$ is the approach angle. Lumping the factors which multiply v in equation 6 together yields a conversion factor, $K_v$, relating fluid velocity to Doppler shift. Assuming $f_{cw}$=24.125 GHz, and $\psi$=35°, then $K_v$=132 Hz/mps or 40.2 Hz/fps. Thus, Scale 4 is adequate to measure fluid velocities commonly encountered in, for example, sewers, with Scale 3 and Scale 5 being needed only in extreme cases.

The decimation process also affects range response if each FFT frame does not receive an IF signal representative of the intended bandwidth and shape of the emitted non-linear step profile. Each "mini-minaret" of FIG. 10 represents those frequencies from one particular "phase" of the reordering algorithm. Each subsequence of FIG. 10 retains very nearly the same bandwidth and statistical frequency distribution as the complete minaret profile of FIG. 8. Since each FFT frame on Scale 3 of FIG. 9 receives data from one mini-minaret, no significant degradation of range resolution occurs beyond the effect of having a short FFT window. Similarly, with Scale 4, each FFT receives data from three mini-minarets having similar bandwidths and frequency distributions. Since each mini-minaret includes a set of frequencies distinct from the others, there is no sub-frame periodicity and consequently no grating lobes. Finally, Scale 5 depicts a single FFT frame that receives data from fifteen mini-minarets that contain, by construction, completely different frequencies from one another, while encompassing nearly the same bandwidth and frequency distribution as the original non-linear step profile.

The polyphase minaret sequence in a number of embodiments is "robust" under the particular integer decimations (for example, 3 and 5) for which it was designed. This sequence allows multi-scale spectral analysis to be done with very little penalty in physical range resolution or magnitude of range peak side lobes.

The construction of frequency profiles according to the described method permits multi-scale spectral analysis to be applied in, for example, a radar, UV, or sonar ranging instrument. Advantages of ranging instruments with multi-scale spectral analysis include less computational load, less memory, lower power, and lower cost while maintaining superior range resolution and a short minimum detectable target range.

A single instrument, device or system for measuring distance and velocity, both using multi-scale spectral analysis is envisioned. This instrument may, for example, employ a single computation engine and code set to facilitate both velocity and depth measurements.

Figure 13:
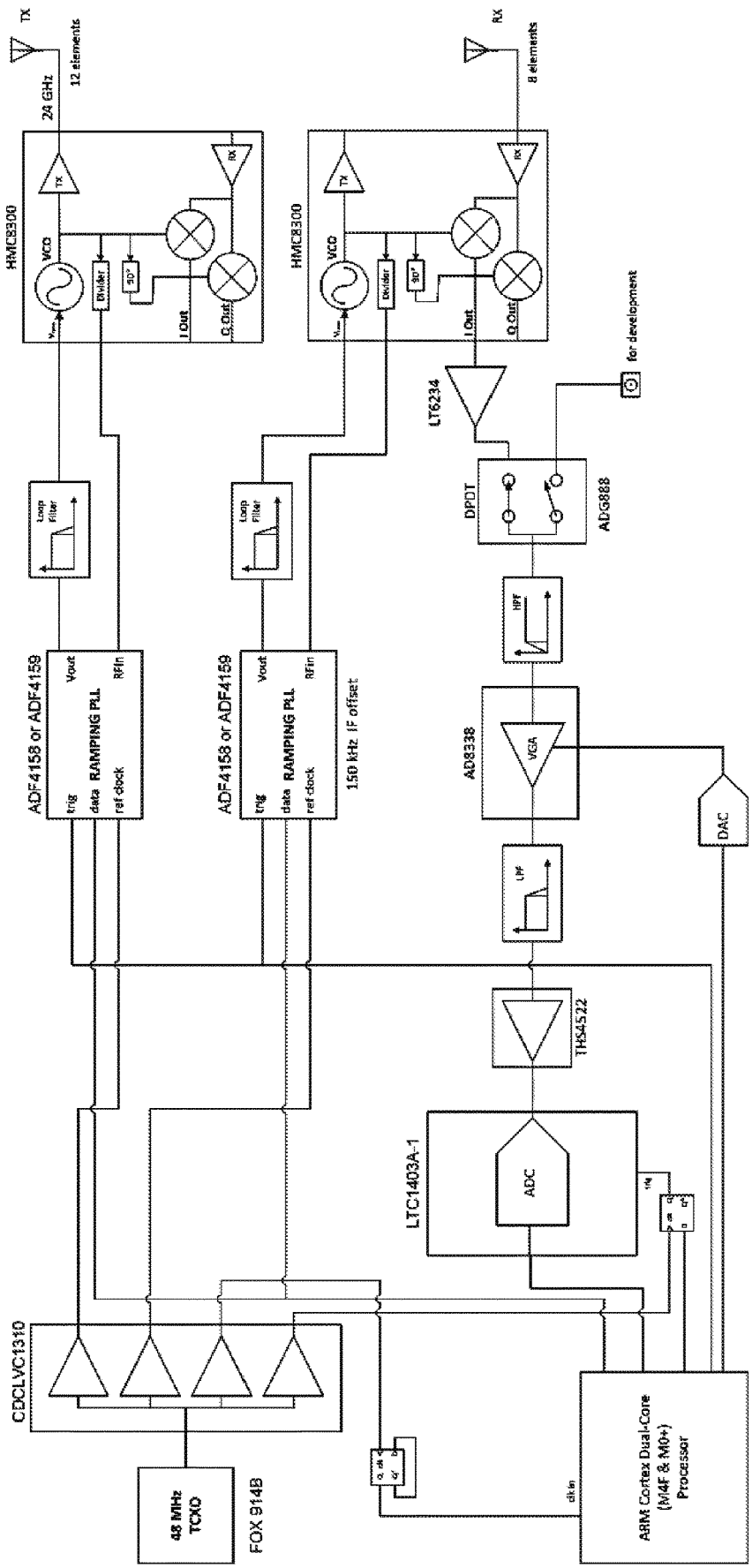
FIG. 13 illustrates a block diagram of a complete radar instrument.

FIG. 13 illustrates an embodiment of a radar system for use herein. The system includes two identical frequency synthesizers, each consisting of a ramping PLL, associated loop filter, and identical radar transceiver MIMIC's (Monolithic Microwave Integrated Circuit) containing K-band VCO's. The VCO in the top MMIC drives the transmit antenna (via an integrated power amplifier), while the second VCO drives the LO input on an integrated receive mixer. The reference clocks of both PLL's are derived from a common clock reference. This, and the fact that both frequency synthesizers are identical, leads to low values of round-trip phase noise despite a 150 kHz frequency offset between the two VCO's.

Figure 14:
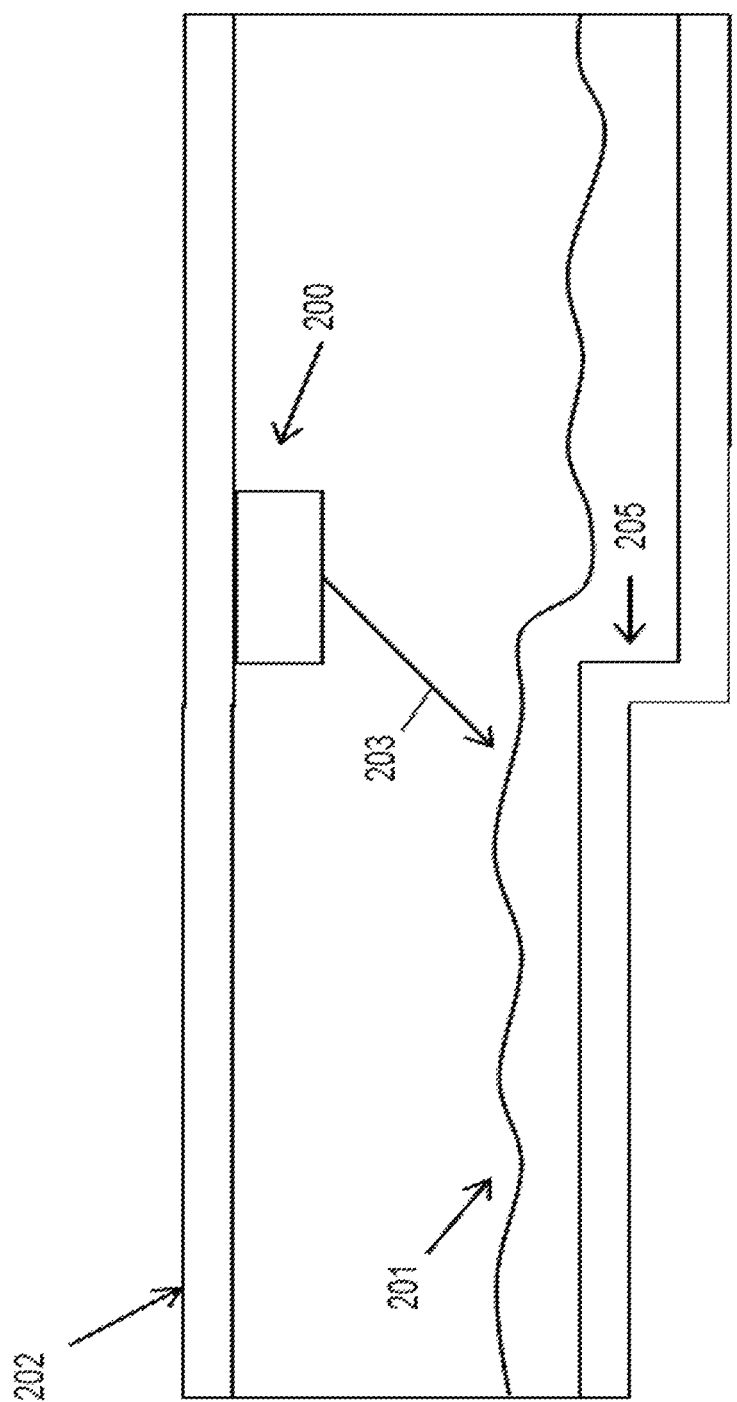
FIG. 14 illustrates a diagram of a single beam device or system hereof for determining fluid level (and potentially fluid velocity) in a fluid conduit (for example, a pipe).

FIG. 14 illustrates a representative example of a non-contact system for measuring fluid level (as well as flow velocity) in a pipe 202 hereof. In a number of embodiments, the devices, systems and method here may, for example, be used in connection with a non-contact measuring system as described in the commonly owned U.S. patent application Ser. No. 15/711,483, entitled "SINGLE-BEAM RADAR AND VELOCITY SENSING" filed contemporaneously herewith, the disclosure of which is incorporated herein by reference. In the illustrated embodiment, a single measurement beam 203 is aimed toward a fluid surface 201. The single beam 203 may, for example, include energy such as electromagnetic energy, ultrasonic energy, acoustic energy, or a combination thereof. In a number of embodiments, the single beam system 200 may, for example, include a radar-based sensor or transducer capable of transmitting the beam 203 and receiving the plurality of reflections that result from the beam 203 contact with the fluid surface 201. The system 200 may, for example, employ a single transmit/receive antenna or may use one or more dedicated transmit antennas and one or more dedicated receiver antennas. In a number of embodiments, the single beam system 200 may be optimized for a beam angle of between about 25 and about 45 degrees above the fluid surface 201. In a number of embodiments, the angle is approximately 35 degrees. The single beam system 200 may, for example, be positioned at an optimal location for interference-free beam transmission. In a number of embodiments, the single-beam system 200 may be mounted to an upper portion of the inside of an enclosed pipe 202, as shown in FIG. 14. In practical use, the single-beam system 200 may be mounted in a vault beneath a manhole, and the beam may be aimed upstream or downstream into a pipe.

The single beam system, may be used, for example, to measure fluid velocity and fluid level at a single point. Calculations of volumetric flow rate from a single beam system may result in higher accuracy as compared to two beam systems. In a representative example, if a step change in pipe diameter occurs 205, a single beam 203 system would still return an accurate estimate of volumetric flow rate. A two beam system, wherein fluid velocity and fluid level may be measured at two distinct points, may not return an accurate estimate of volumetric flow rate.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method for constructing a frequency profile of an emitted signal suitable for use in a non-contact ranging system with multi-scale spectral analysis, comprising:
    determining N stepped frequency chirps, wherein each frequency chirp of the N stepped frequency chirps has a linear FM modulation of a predetermined bandwidth and slope, and wherein a starting frequency for each of the plurality of stepped frequency chirps is chosen so that a non-linear step profile is created which extends over a predetermined total bandwidth,
    sorting the plurality of N stepped frequency chirps into P sub-sequences, where P is equal to the product of decimation factors to be used in the multi-scale spectral analysis, and
    ordering the P sub-sequences end to end in time;
    wherein each of the plurality of N stepped frequency chirps is represented only once in the P sub-sequences and each of the P sub sequences extends to at least 90% of the predetermined total bandwidth.

2. The method of claim 1 wherein the duration of emitting the P sub-sequences or a multiple of the P sub-sequences is equal to the duration of a longest duration frame in the multi-scale spectral analysis or a multiple thereof.

3. The method of claim 1 wherein, on each analysis scale, the frame length is an integer multiple of the sub-sequence length.

4. The method of claim 2 further comprising:
    prior to sorting the plurality of N stepped frequency chirps into P sub sequences, enumerating groups of the N stepped frequency chirps as $G_0$ through $G_{(N-1)}$ to define even-indexed groups of frequency chirps and odd-indexed groups of frequency chirps; and
    reordering one of the even-indexed groups of frequency chirps and the odd-indexed groups of frequency chirps in time to begin at an end of the other one of the even-indexed groups of frequency chirps and the odd-indexed groups of frequency chirps and in reverse order.

5. The method of claim 4 wherein sorting the N stepped frequency chirps into P sub-sequences comprises:
    re-enumerating the reordered frequency chirps as $C_0$ through $C_{(N-1)}$; and
    sorting the reordered frequency chirps into P sub-sequences, wherein $\{\text{sub-sequence}\}_n = \{C_n, C_{(n+P)}, C_{(n+2P)}, C_{(n+3P)}, \ldots \}_n$, where n=0 to (P−1).

6. The method of claim 1 wherein the slope of each of the plurality of frequency chirps is selected to resolve a minimum range target frequency from a zero range frequency.

7. The method of claim 1 wherein the fastest sampling rate is equal to or a multiple of the step rate for the plurality of N stepped frequency chirps.

8. The method of claim 1 wherein a total bandwidth of the non-linear step profile is chosen to attain a desired distance resolution in frequency modulated continuous wave radar.

9. The method of claim 8 wherein the predetermined total bandwidth of the non-linear step profile is greater than or equal to 1.5 GHz.

10. The method of claim 1 wherein the non-linear step profile is chosen to control the magnitude of unwanted spectral side lobes.

11. The method of claim 10 wherein the non-linear step profile comprises a parametric frequency profile or a tapering distribution.

* * * * *